US 6,646,200 B1

(12) United States Patent
White et al.

(10) Patent No.: US 6,646,200 B1
(45) Date of Patent: Nov. 11, 2003

(54) APPARATUS, SYSTEMS, AND METHODS FOR ADJUSTING THE POSITION OF A HANGING AERIAL TERMINAL

(75) Inventors: Isaac Daniel McIntosh White, Orlando, FL (US); Kevin Forsberg, Orlando, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/207,351

(22) Filed: Jul. 29, 2002

(51) Int. Cl.[7] .......................................... H02G 15/113
(52) U.S. Cl. ...................... 174/41; 174/40 TD; 174/59; 174/92; 248/61; 138/107
(58) Field of Search ..................... 174/40 R, 40 CC, 174/40 TD, 41, 43, 45 TD, 59, 60, 92, 93; 138/107; 248/61, 63, 214, 215, 216.4, 220.21, 220.22, 226.11, 229.23, 231.51

(56) References Cited

U.S. PATENT DOCUMENTS

| | | | | |
|---|---|---|---|---|
| 1,352,549 A | * | 9/1920 | Sinclair | 248/61 |
| 3,701,835 A | * | 10/1972 | Eisele et al. | 174/41 |
| 3,836,696 A | * | 9/1974 | Gressitt et al. | 174/41 |
| 4,414,426 A | | 11/1983 | Burtelson | |
| 4,513,171 A | * | 4/1985 | Suffi et al. | 174/41 |
| 4,536,611 A | * | 8/1985 | Butler | 174/41 |
| 4,647,715 A | * | 3/1987 | Butler | 174/41 |
| 4,694,118 A | | 9/1987 | Schmidt | |
| 4,812,942 A | | 3/1989 | Kupferschmidt et al. | |
| 4,818,824 A | * | 4/1989 | Dixit et al. | 174/92 |
| 4,908,482 A | | 3/1990 | Shimirak et al. | |
| 4,992,627 A | | 2/1991 | Mullany | |
| 4,994,630 A | * | 2/1991 | Schilling | 174/41 |
| 5,136,121 A | * | 8/1992 | Kluska et al. | 174/93 |
| 5,137,057 A | * | 8/1992 | Hummert, III | 138/107 |
| 5,247,135 A | | 9/1993 | Rebers et al. | |
| 5,266,741 A | * | 11/1993 | Butler | 174/92 |
| 5,323,454 A | | 6/1994 | Shay et al. | |
| 5,429,330 A | * | 7/1995 | Bond et al. | 248/61 |
| 5,489,039 A | | 2/1996 | Brownlie et al. | |
| 5,495,549 A | | 2/1996 | Schneider et al. | |
| 5,525,756 A | | 6/1996 | Mullaney et al. | |
| 5,557,067 A | | 9/1996 | Messelhi | |
| 5,561,268 A | | 10/1996 | Dagan et al. | |
| 5,897,081 A | * | 4/1999 | Dechen | 174/41 |
| 6,096,973 A | | 8/2000 | Kluska et al. | |
| 6,152,760 A | | 11/2000 | Reeser | |
| 6,222,968 B1 | | 4/2001 | Dotzer et al. | |
| 6,359,228 B1 | | 3/2002 | Strause et al. | |

* cited by examiner

Primary Examiner—Dean A. Reichard
Assistant Examiner—Adolfo Nino
(74) Attorney, Agent, or Firm—Bambi Walters; Scott Zimmerman; Marcus Delgado

(57) ABSTRACT

Apparatus, systems, and methods provide for a hanging aerial terminal including means to rotationally adjust positions or means to adjust positions in a cantilever fashion. This invention also includes a kit-of-parts for a hanging aerial suspension system capable of being assembled with conventional hanging aerial terminals. Still further, this invention includes a locking device having means to securely position the hanging aerial terminal at a selected location.

20 Claims, 14 Drawing Sheets

FIG. 5A
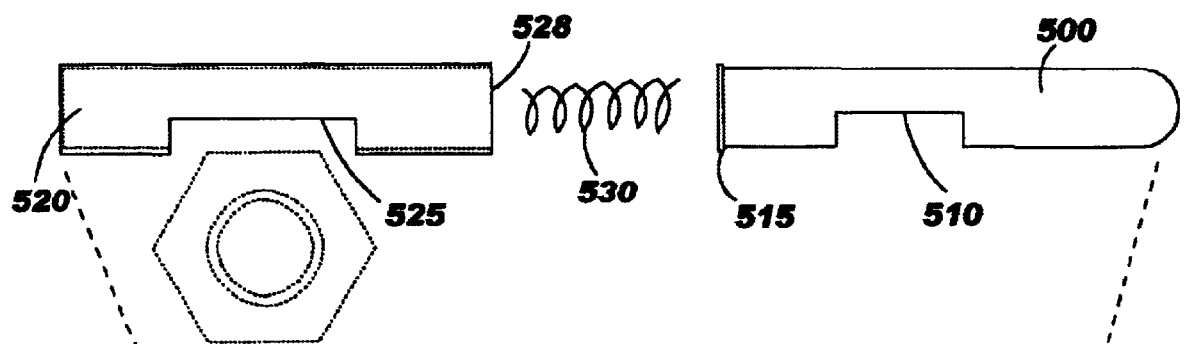
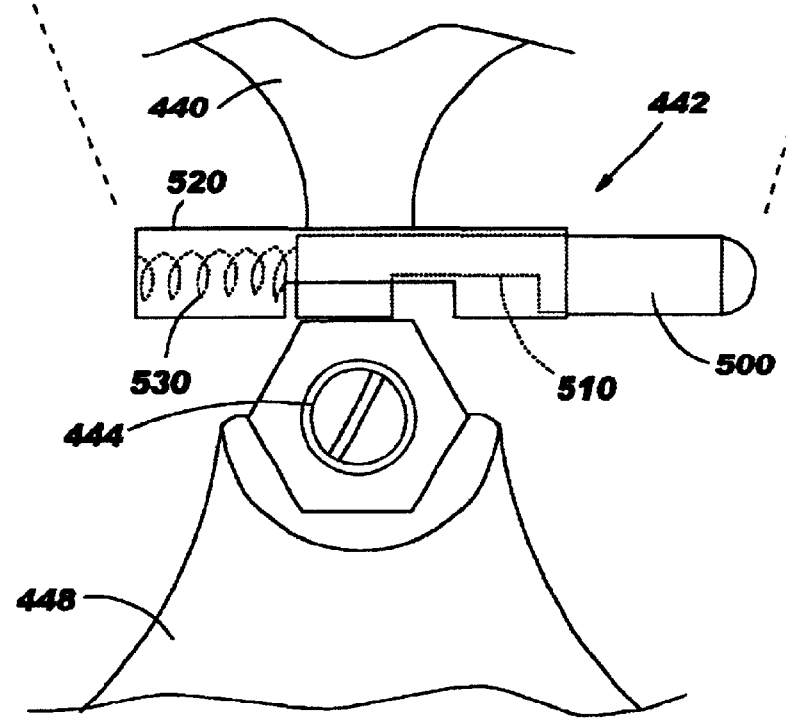
FIG. 5B

APPARATUS, SYSTEMS, AND METHODS FOR ADJUSTING THE POSITION OF A HANGING AERIAL TERMINAL

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention relates generally to the field of telecommunications, and, in particular, to apparatus, systems, and methods for adjusting the position of a hanging aerial terminal.

2. Description of the Related Art

Conventional aerial terminals are terminals mounted at an elevated position for distributing communication signals from one or more routing cables to customers via drop wires. As used herein, the term "communications signals" includes telephony, video, cable, and any other electromagnetic signals including broadband signals and interactive signals that can be carried over a communications cable. As used herein, the term "routing cables" includes cables that are routed from a central office or other location (e.g., a crossbox) to a wire center or a turf that is within a local geographical area of a called telephone number. Typically, a routing cable includes multiple cables bundled together into one cable and surrounded by a protective sheath so that the resulting routing cable may be easily and securely routed over long distances. As used herein, the term "drop wires" includes wires that are connected with a customer's premises, such as twisted-pair drop, F-drops, C rural drops, coaxial cable, Category 3, 5, and 7 cables, and/or other wires routed from aerial terminals. These drop wires may be connected directly with a communications device, such as a telephone, or more typically, the drop wires may be coupled with other wires integral with the customer's premise to eventually connect with the customer's communications device.

A common technique for connecting routing cables and drop wires is by terminating the routing cable and splicing it with the drop wire in a hanging aerial terminal or other appropriate telecommunications closure. As used herein, the term hanging aerial terminal includes hanging or suspended terminals, closures, enclosures, housings, and other devices used to house routing cables and/or drop wires. Hanging aerial terminals may be polygon or non-polygon shaped and constructed of any appropriate material, such as, for example, metal, polymer, plastic, ceramic, glass, crystal, and/or combinations thereof. The routing cable is separated at one of the ends into individual routing wires, and an end of a routing wire is mated in the terminal on a terminal block with an end of the drop wire. Each drop wire is usually mounted in a passageway (e.g., a bore, channel, groove, or any other similar structure) formed through the terminal. The drop wire is further routed out of the passageway and then to the location (e.g., customer's home or business located at an address) associated with the called telephone number.

Conventional hanging aerial terminals include a support member that is securely mounted, or otherwise securely attached, to the routing cable, a support wire, and/or combinations thereof. Unfortunately, these conventional hanging aerial terminals do not provide optimal access to the interior components disposed within. For example, U.S. Pat. No. 4,414,426 discloses a rectangular-shaped, hanging aerial terminal having a front cover that provides access to interior components when removed. The hanging aerial terminal is suspended from a routing cable and a support wire by ties. These ties pass through brackets attached to the aerial terminal housing and securely position the hanging aerial terminal. Similarly, U.S. Pat. No. 5,247,135 discloses a hanging aerial terminal having a lid along an outer wall. The lid, when open, provides access to the interior components. The hanging aerial terminal is suspended from a support cable by means of a pair of support members attached to the aerial terminal housing. These arrangements do not effectively allow an individual, such as a telephone technician, repairperson, and installer, to optimally gain access to the interior components of the hanging aerial terminal when the technician is positioned at an alternate location from the front cover or lid. For example, if there is a fence or other obstacle blocking a ground area relative to the cover side of the hanging aerial terminal, then the technician must position a ladder or other elevating device on a ground area of a non-cover side and bend around a back portion of the terminal in order to gain access through the opened cover or lid. Further, the individual does not have a great deal of room to work and frequently uses one hand to assist in securing a fixed position above the ground, thus making it more difficult for the individual to gain access to the terminal, including internal components, when positioned towards the non-cover side of the terminal.

Accordingly, it is highly desirable to have an adjustable hanging aerial terminal that provides many features of conventional hanging aerial terminals while providing an individual, such as a technician, with greater access to the terminal and more useable work space.

SUMMARY OF THE INVENTION

This invention addresses the above-described and other needs by providing an apparatus, systems, and methods for adjusting the position of a hanging aerial terminal. This invention includes telecommunications aerial terminals, support systems, and methods having means to rotationally adjust positions or means to adjust positions in a cantilever fashion in order to provide an individual with greater access to the terminal and more usable work space. Further, this invention includes a locking device having means to securely position the aerial terminal at a selected location.

In a first embodiment, this invention includes a hanging aerial terminal having a means for fastening the terminal to at least one adjustable joint such that the terminal can rotate or otherwise move about the adjustable joint. In a second embodiment, this invention includes a hanging aerial terminal having a means to adjust positions in a cantilever fashion, such as, for example, by attaching the hanging aerial terminal to a lower arm of a hanging aerial terminal suspension system that allows the lower arm to move in a cantilever fashion in relation to an upper arm of the hanging aerial terminal suspension system. In other embodiments, this invention includes a kit-of-parts for a hanging aerial suspension system capable of being assembled with conventional hanging aerial terminals such that the resulting apparatus provides the hanging aerial terminals as described in the above first and second embodiments. Still further, this invention provides several methods of adjusting the positions of the hanging aerial terminals described in the above embodiments.

BRIEF DESCRIPTION OF THE DRAWINGS

The above and other embodiments, objects, uses, advantages, and novel features of this invention are more clearly understood by reference to the following description taken in connection with the accompanying figures, in which:

FIG. 5A is a partial perspective exploded side view of a locking mechanism for an adjustable joint of the apparatus shown in FIG. 4;

FIG. 5B is a partial perspective side view of the adjustable joint with the locking mechanism of FIG. 5A engaged;

DETAILED DESCRIPTION OF THE INVENTION

Figure 1:
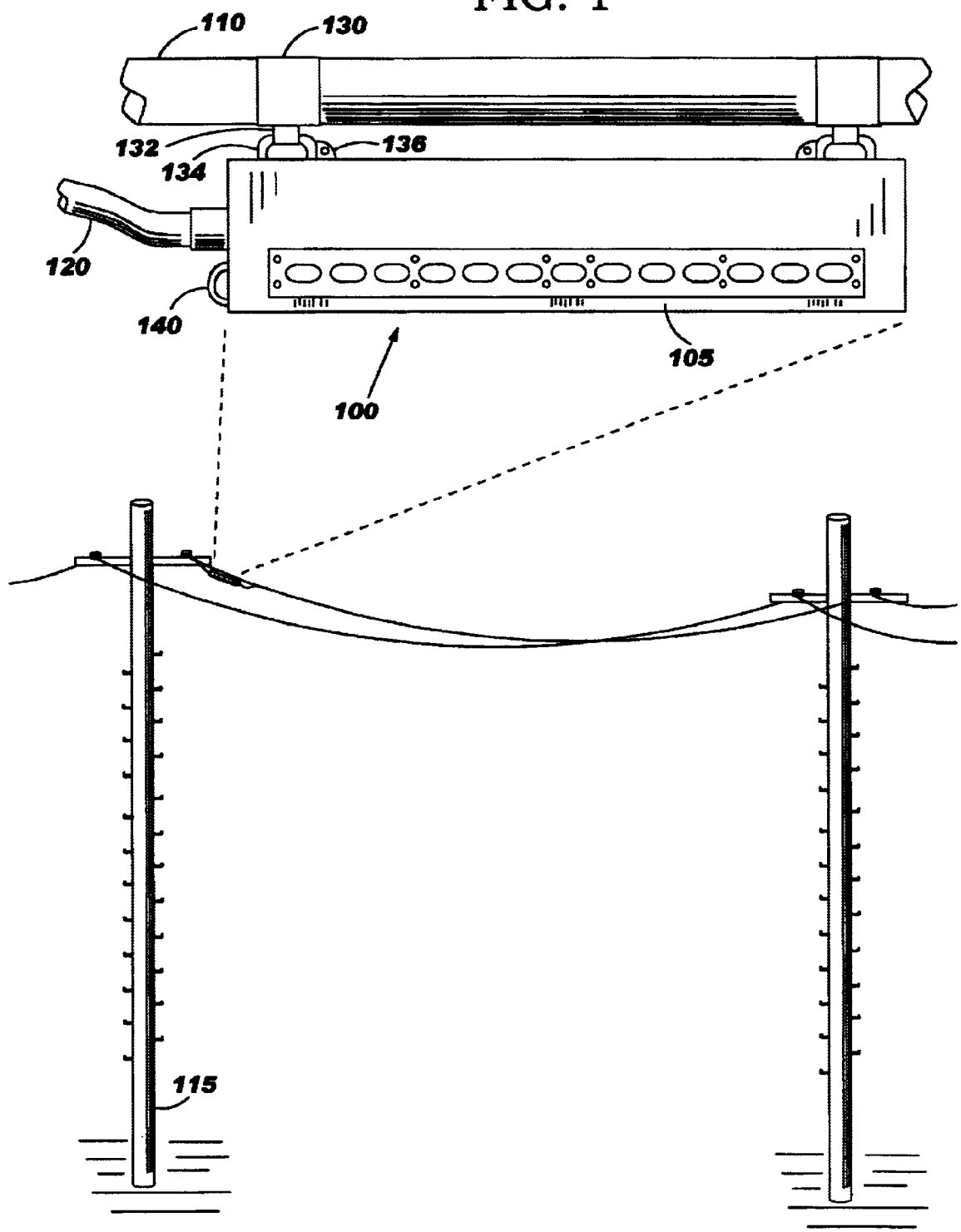
FIG. 1 is a perspective view of a telecommunications pole with an adjustable hanging aerial terminal, including a partial exploded perspective view of the adjustable hanging aerial terminal, according to an embodiment of this invention.

This invention now will be described more fully hereinafter with reference to the accompanying drawings, in which exemplary embodiments are shown. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Thus, for example, it will be appreciated by those skilled in the art that the schematics and the like represent conceptual views of illustrative structures embodying this invention.

In the claims hereof any element expressed as a means for performing a specified function is intended to encompass any way of performing that function including, for example, a combination of elements that performs that function. The invention as defined by such claims resides in the fact that the functionalities provided by the various recited means are combined and brought together in the manner that the claims call for. Applicant thus regards any means that can provide those functionalities as equivalent as those shown herein.

This invention is directed to an adjustable hanging aerial terminal that provides capabilities for adjusting the position of the hanging aerial terminal by means of a rotationally adjustable joint or by means of a suspension system that moves the aerial terminal in a cantilever fashion. This invention also provides for a locking mechanism to fix or secure the aerial terminal at a selected position, such as when the aerial terminal is not being worked on or serviced by an individual. Further, this invention includes the adjustable hanging aerial terminal, a kit-of-parts for converting a conventional aerial terminal to an adjustable hanging aerial terminal, and a method of adjusting the adjustable hanging aerial terminal to a selected position.

As shown in the accompanying figures, the design of an adjustable hanging aerial terminal is based on conventional designs of hanging aerial terminals. One advantage of using conventional hanging aerial terminal designs is that it illustrates a variety of hanging aerial terminals, even those already installed in the field, that can easily be upgraded to the adjustable hanging aerial terminal. Some of these upgrades can be made without disturbing the connections between the routing cable and/or wires and the drop wires of the existing hanging aerial terminal structure. These upgrades are typically made by removing the mounting elements of the existing hanging aerial terminal, ensuring that the cables and wires have enough slack for movement on or along the desired travel path, and by adding the adjustable joint to rotational move the terminal or by adding the suspension system capable of moving the terminal in a cantilever fashion. Suitable examples of existing hanging aerial terminals that may be retrofitted are disclosed in U.S. Pat. Nos. 4,414,426 and 5,247,135, and the "Detailed Description" section of the '426 and '135 patents are incorporated herein by reference.

FIG. 1 illustrates an exemplary adjustable hanging aerial terminal 100 mounted to a routing cable 110 suspended by a telecommunications pole 115. The adjustable hanging aerial terminal 100 is mounted to the routing cable 110 by an aerial terminal suspension system. The aerial terminal suspension system includes a pair of longitudinally spaced, support brackets 130 bolted, attached, or otherwise secured to an adjustable joint 132. The adjustable joint 132 is fastened to a pair of housing brackets 134 of the adjustable hanging aerial terminal 100. Other fastening devices and other mounting devices may be used, such as, for example nuts, bolts, screws, rivets, welding, and the like. Further, the adjustable joint 132 includes a locking mechanism 136 that is capable of securing the adjustable hanging aerial terminal 100 in a selected position about the adjustable joint 132. Although not illustrated, the support brackets 130, adjustable joint 132, housing brackets 134, and/or locking mechanism 136 may by connected or otherwise attached to a grounding strip.

The adjustable hanging aerial terminal 100 further includes a cover section 105 that is securable to a housing section in a manner permitting the cover section 105 to be opened to provide access to at least one terminal block interconnecting at least one routing wire 120 of a routing cable 110 and at least one drop wire (not shown). The routing wire 120 and drop wires (and, if applicable, ground wire) are clamped to the routing cable 110 and/or support wire (shown as reference numeral 1020 in FIGS. 10–13) with enough slack to allow the adjustable hanging aerial terminal 100 to swivel, rotate, and/or circumferentially travel about the adjustable joint 132 without damaging the routing wire 120 and drop wire(s). Thus, an individual is able to position the adjustable hanging aerial terminal in a variety of locations about the adjustable joint 132, open the cover 105, and gain access to the adjustable hanging aerial terminal 100, including internal components. Further, by using the locking mechanism 136, the individual is able to secure the adjustable hanging aerial terminal 100 in a select location, and, thereafter, use both hands to work, test, install, and/or perform maintenance on the adjustable hanging aerial terminal 100. In addition, the adjustable hanging aerial terminal 100 may include a hooking device or a hook portion 140 that allows an individual to apply a force from a variety of location so that the individual can adjust the position about the adjustable joint 132.

As depicted, the adjustable hanging aerial terminal 100 has a rectangular or square-shape; however, as one of ordinary skill in the art appreciates, the adjustable hanging aerial terminal 100 may take on a variety of shapes, such as cylindrical, triangular, trapezoidal, and combinations thereof. Further, the adjustable hanging aerial terminal 100, the support brackets 130, adjustable joint 132, housing brackets 134, locking mechanism 136, and other components of the aerial terminal suspension system may be manufactured using any appropriate material that can withstand environmental conditions, such as, a wide range of temperatures, humidity, animals (e.g., rodents, birds, etc.), and the like. For example, the housing of the adjustable hanging aerial terminal can be formed of sheets of G90 galvanized steel having a durable finish coating, such as polyurethane powder. Alternatively, the adjustable hanging aerial terminal 100 could be constructed of other appropriate metal, polymer, plastic, ceramic, glass, crystal, and combinations thereof.

Figure 2A:
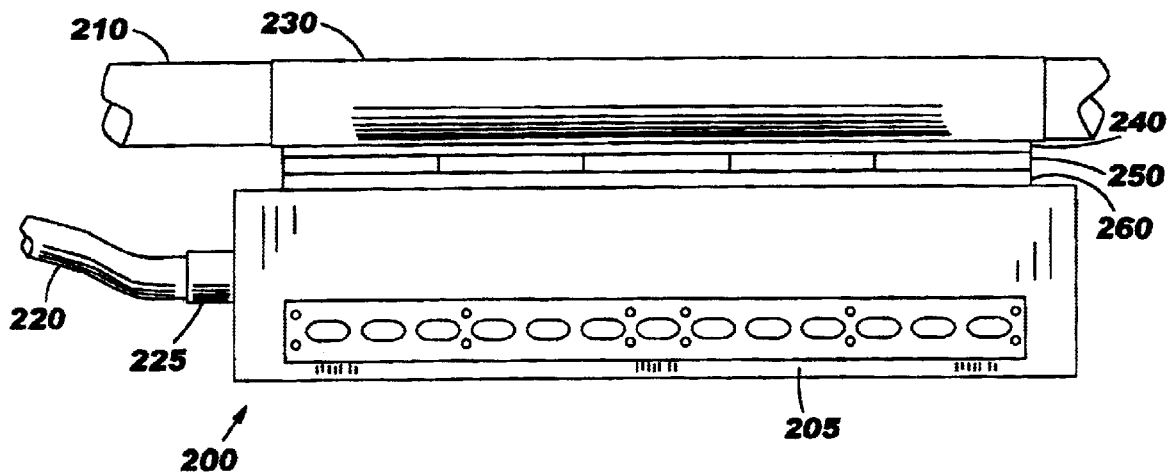
FIG. 2A is a perspective front view of an adjustable hanging aerial terminal according to an embodiment of this invention.
Figure 2B:
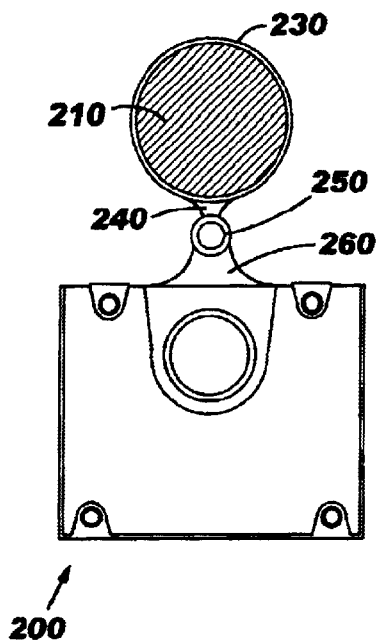
FIG. 2B is a perspective side view of the apparatus of FIG. 2A.
Figure 3:
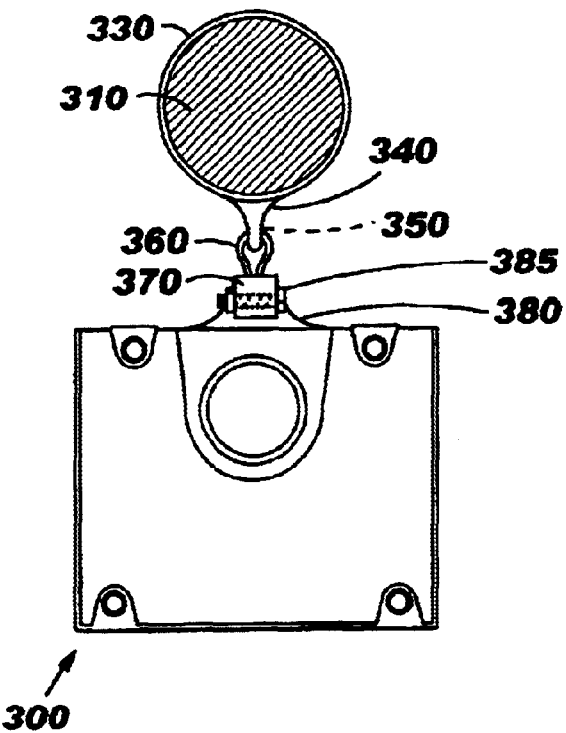
FIGS. 3–4 are perspective side views of hanging aerial terminals according to alternate embodiments of this invention.
Figure 4:
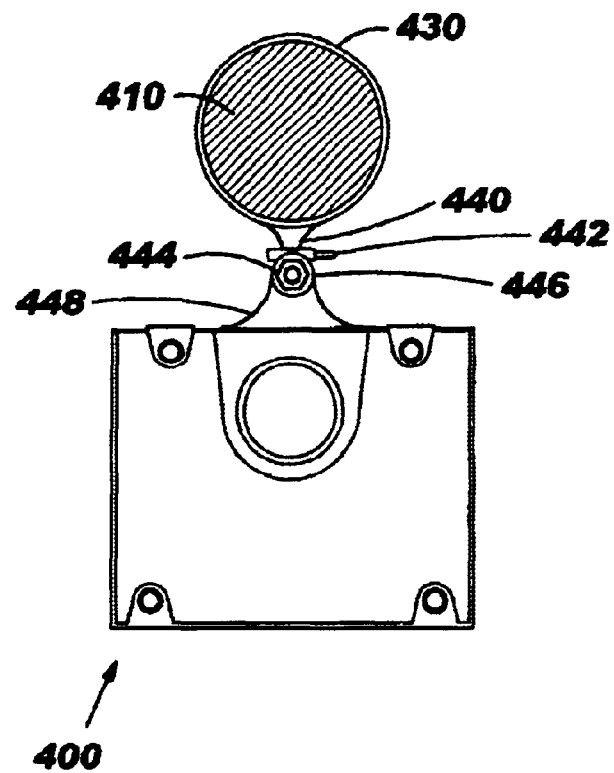

FIGS. 2A, 2B, and 3–4 illustrate alternative configurations and designs for adjustable joints for use with adjustable hanging aerial terminals. FIGS. 2A and 2B depict a lengthwise extending adjustable joint 250 that engages a lengthwise extending housing bracket 260 of the adjustable hanging aerial terminal 200 and a lengthwise extending support bracket 240 of a lengthwise extending support member 230 that is secured to a routing cable 210. The adjustable joint 250, the housing bracket 260, and the support bracket 240 enable the adjustable hanging aerial terminal 200 to swivel or rotate about a longitudinal axis of the adjustable joint 250 so that the adjustable hanging aerial terminal 200 can be positioned in a variety of locations about the axis. FIG. 3 depicts an alternate adjustable joint design that includes a support bracket 340 of a support member 330 that is secured to a routing cable 310. The support bracket 340 includes an aperture 350 that allows an engagement strap 360 to be secured therethrough. The engagement strap 360 is, in turn, bolted or otherwise secured to a portion 370 of the adjustable hanging aerial terminal 300 by means of a bolt and nut assembly 385 and terminal housing clamp 380.

FIGS. 4, 5A, 5B, and 6 illustrate a preferred embodiment of an adjustable hanging aerial terminal 400 having an adjustable joint 444 with a locking mechanism 442 to secure a selected position. The apparatus of this embodiment includes a support bracket 440 of a support member 430 that is secured to a routing cable 410. The support bracket 440 includes the locking mechanism 442 and engagement means to the adjustable joint 444. Alternatively, the adjustable joint 444 may be an integral component of the support bracket 440. The adjustable joint is secured to the adjustable hanging aerial terminal 400 by means of an adjustable joint base assembly 448 that functions similarly to the housing bracket 260 of FIG. 2. The adjustable joint base assembly 448 may be attached to the adjustable hanging aerial terminal 400 by any appropriate means, including nuts, bolts, screws, rivets, welding, adhesive, welds, and the like.

Figure 6:
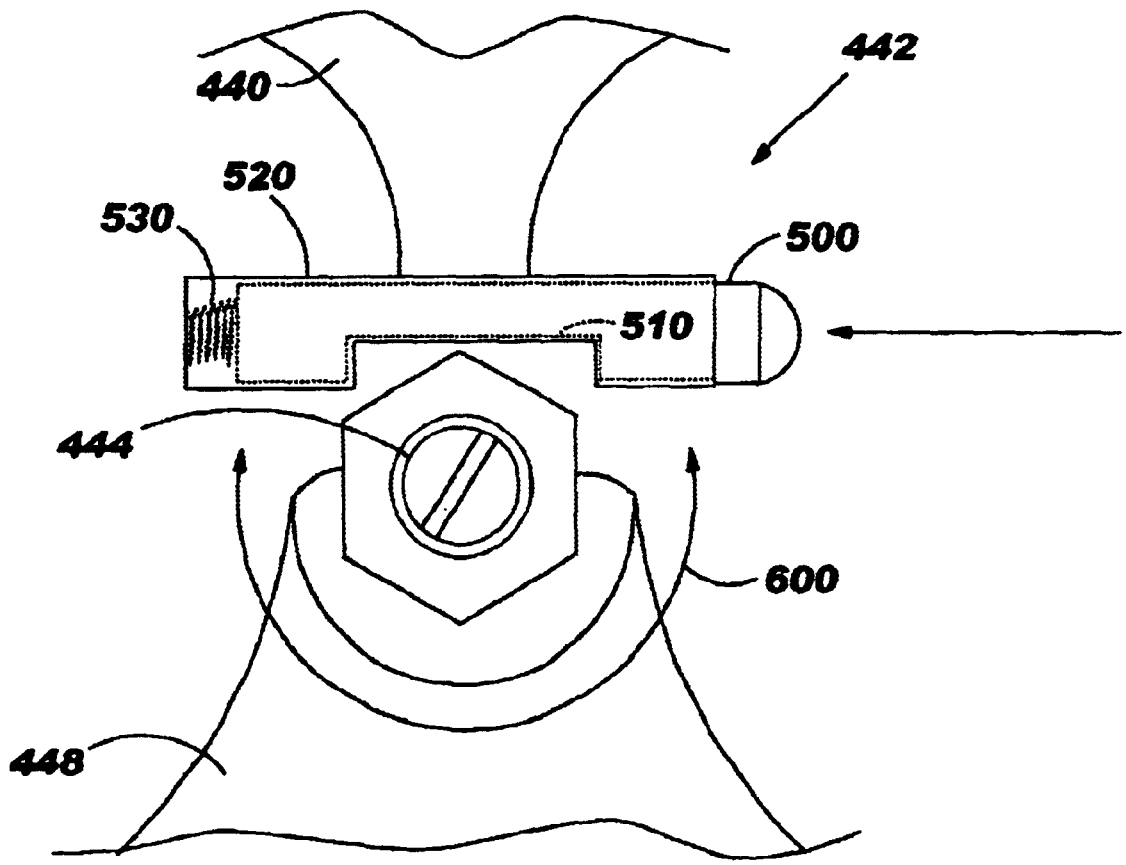
FIG. 6 is a partial perspective side view of the adjustable joint with the locking mechanism of FIG. 5A disengaged.

Referring now to the more detailed illustrations of FIGS. 5A and 5B, the locking mechanism 442 includes a hollow, cylindrical shaped section 520 with a cut-away portion 525 and an open end 528. As FIG. 5B shows, a spring 530 and a locking pin 500 slide into the open end 528. The locking pin 500 further includes a spring attachment 515 and a complimentary cut-away portion 510. FIG. 5B further illustrates the locking mechanism 442 engaged such that the adjustable joint 444 is secured in position and does not rotate. FIG. 6 shows the locking mechanism 442 disengaged when an external force is applied in a longitudinal direction with respect to locking mechanism 442 to align the cut-away portion 525 and the complimentary cut-away portion 510 such that the adjustable hanging aerial terminal 400 is movable or rotatable in the direction of line 600 (e.g., about a longitudinal axis of the adjustable joint 444). While the locking mechanism 442 is shown as a push-pin and spring type assembly, alternate locking mechanisms may be used to fix or secure the position of the adjustable hanging aerial terminal 400.

Figure 7:
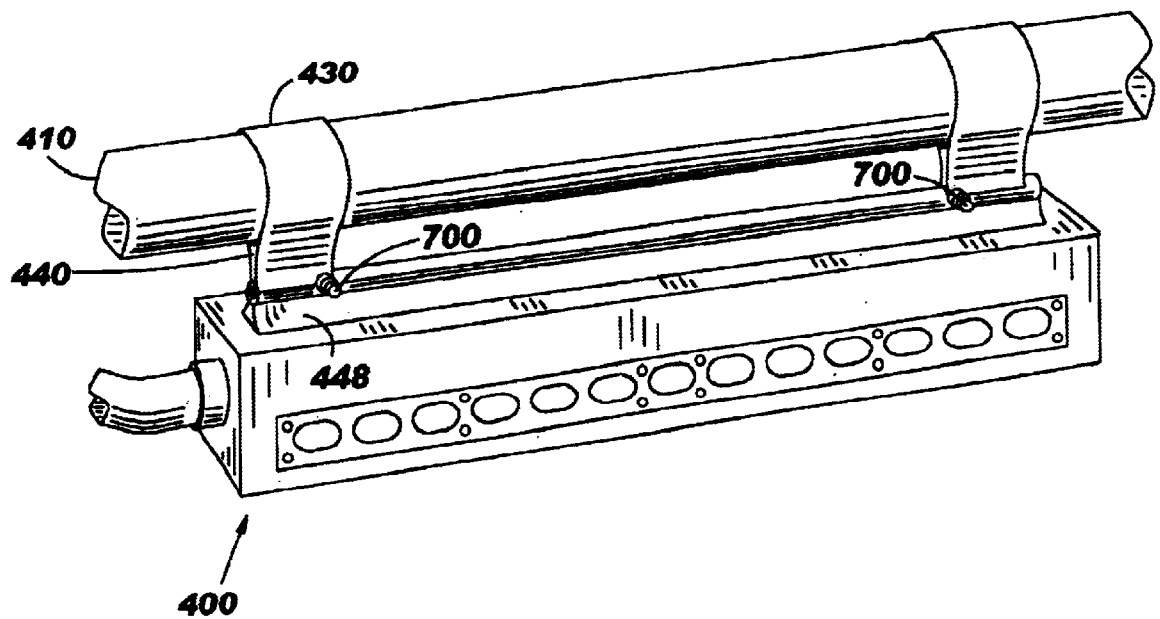
FIG. 7 is an isometric view of the hanging aerial terminal shown in FIG. 4 having a pair of locking mechanisms.
Figure 8:
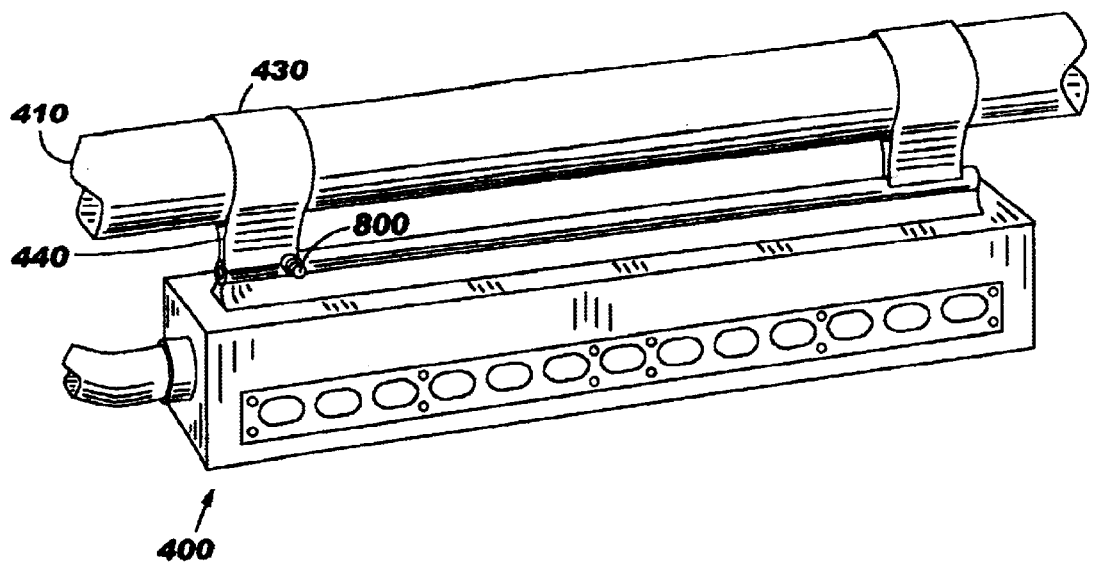
FIG. 8 is an isometric view of the hanging aerial terminal shown in FIG. 4 having one locking mechanism.
Figure 9:
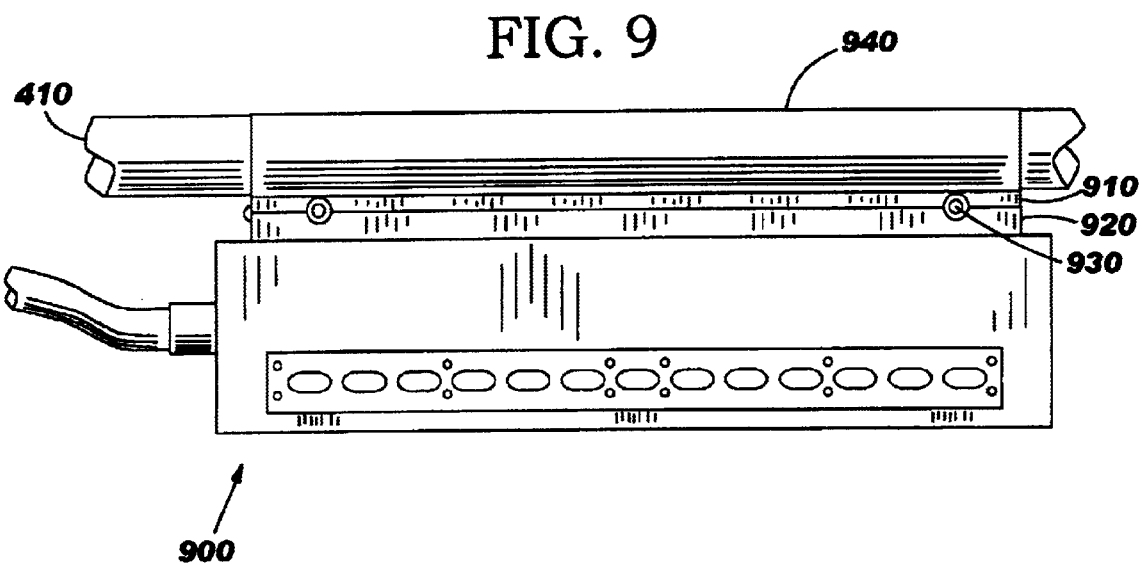
FIG. 9 is a perspective front view of a hanging aerial terminal according to an alternate embodiment of this invention.

FIGS. 7–9 illustrate additional alternative configurations and designs for adjustable joints for use with adjustable hanging aerial terminals. As illustrated in FIG. 7, the adjustable hanging aerial terminal 400 of FIG. 4 may be configured with a pair of locking mechanisms 700, a pair of adjustable joints that engage a pair of support brackets 440, a pair of support members 430, and a pair of adjustable joint base assemblies 448. Similarly, as shown in FIG. 8, the adjustable hanging aerial terminal 400 may also be configured with only one locking mechanism 800. Still further, FIG. 9 depicts an adjustable hanging aerial terminal 900 having a lengthwise extending support bracket 910 attached to a lengthwise extending support member 940 that is secured to a routing cable 410, a housing bracket 920, a pair of locking mechanisms 930, and an adjustable joint (engagement means not shown) contained within the support bracket 910 and the housing bracket 920 to provide greater environmental protection than some of the embodiments described above.

Figure 10:
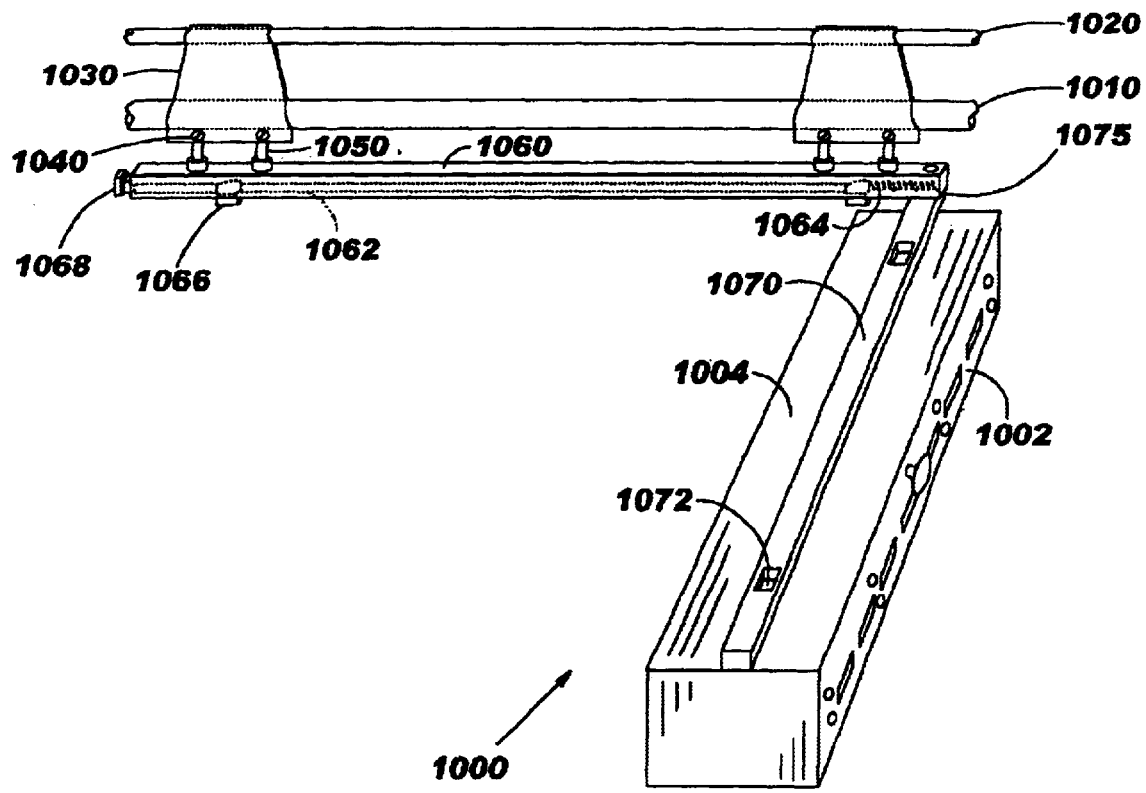
FIG. 10 is an isometric view of an adjustable hanging aerial terminal with a lower arm extended or swiveled approximately 90° from an upper stationary arm according to an embodiment of this invention.
Figure 11:
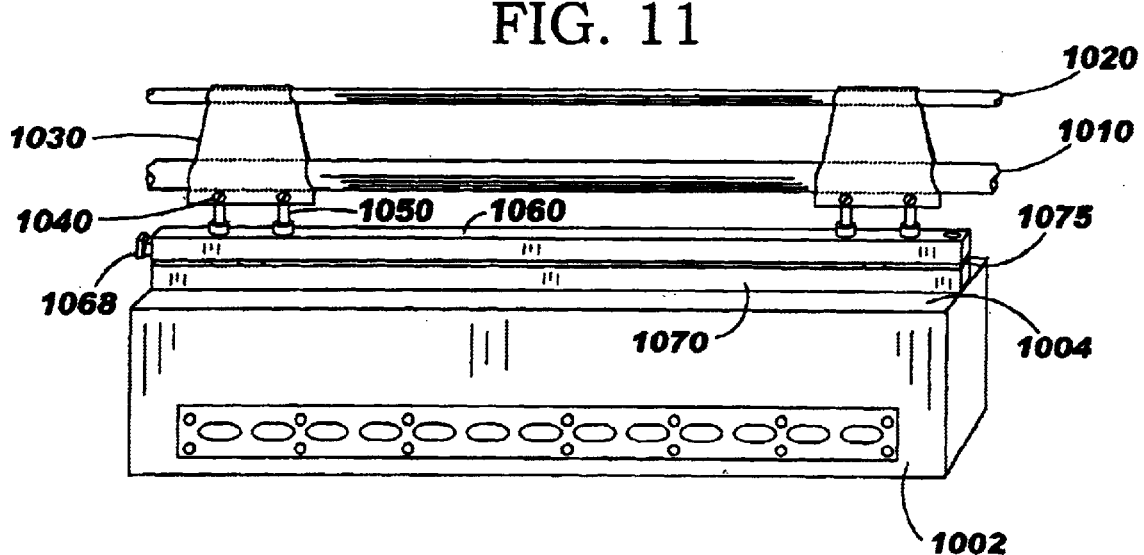
FIG. 11 is a perspective front view of the apparatus shown in FIG. 10 with the lower arm engaged with the upper stationary arm.
Figure 12:
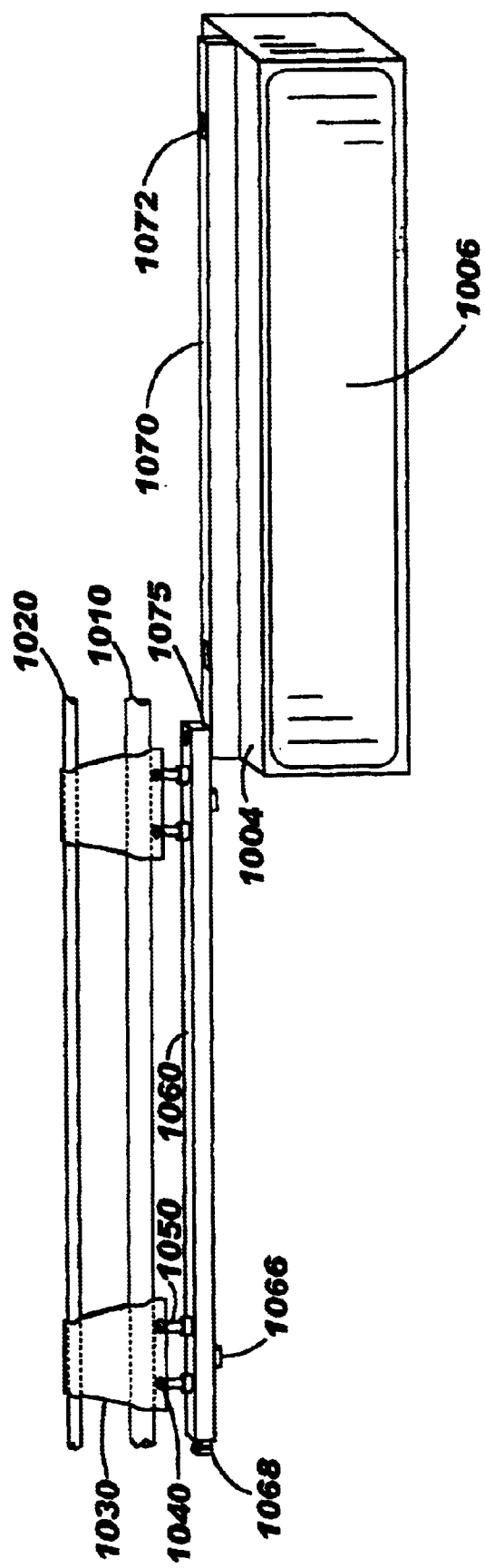
FIG. 12 is a perspective back view of the apparatus shown in FIG. 10 with the lower swivel arm extended approximately 180° from the upper stationary arm.
Figure 13:
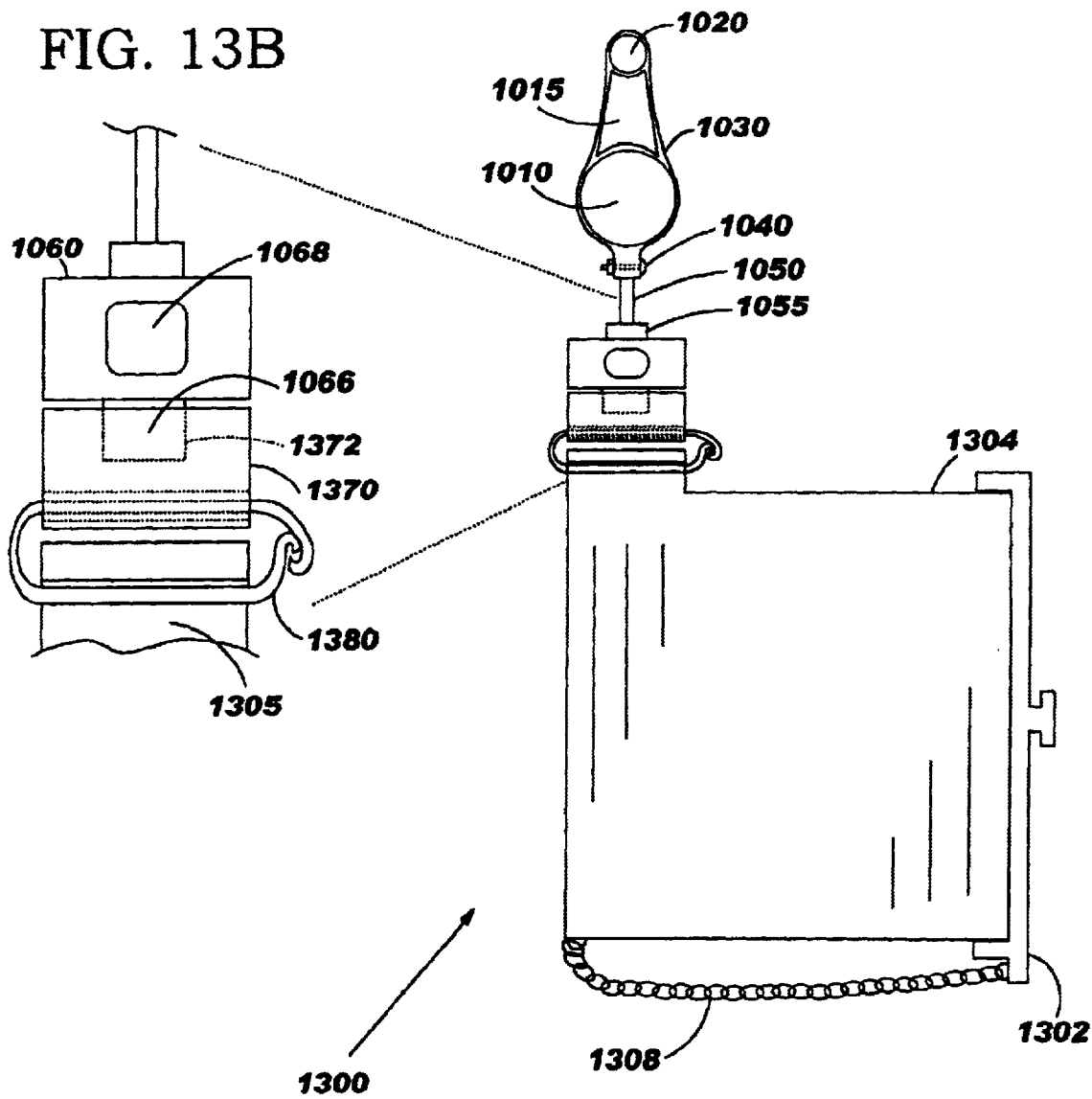
FIGS. 13A, 13B, and 14–17 are perspective side views of adjustable hanging aerial terminals according to alternate embodiments of this invention.

In addition to the above embodiments related to an adjustable hanging aerial terminal (shown as reference numbers 100, 200, 300, 400, and 900 in FIGS. 1, 2A, 2B, and 3–9) having an adjustable joint, this invention also applies to a variety of adjustable hanging aerial terminals with hanging aerial terminal suspension systems that provide means to adjust positions in a cantilever fashion. FIG. 10 illustrates an adjustable hanging aerial terminal 1000 that includes a hanging aerial terminal suspension system with a lower arm 1070 fastened to aerial terminal housing section 1004. The lower arm 1070 swivels open and is capable of adjusting the position of the adjustable hanging aerial terminal 1000 in a cantilever fashion relative to an upper arm 1060. The hanging aerial terminal suspension system further includes means for mounting the upper arm 1060 to a routing cable 1010 and a support wire 1020 that are kept from tangling by a spacer 1015 (the spacer 1015 is shown in FIG. 13A). The means for mounting include a pair of support members 1030 bolted by at least one bolt and nut assembly 1040 or otherwise secured to support brackets 1050 that are attached to the upper arm 1060. The upper arm 1060 is pivotally connected 1075 end to end with the lower arm 1070 so that, as shown in FIG. 10, the lower arm 1070 can swing out to form a cantilevered-type arm from which the adjustable hanging aerial terminal 1000 is suspended. Other fastening devices and other mounting devices may be used, such as, for example nuts, bolts, screws, rivets, welding, and the like. Further, the adjustable hanging aerial terminal 1000 may include a locking mechanism including a lengthwise extending locking push-pin and spring assembly that include a push-pin 1068 having retractable raised surfaces 1066 and a spring 1064 such that the raised surfaces 1066 are capable of securely engaging complimentary grooves 1072 to position the adjustable hanging aerial terminal 1000 in a closed position as shown in FIG. 11. The advantage of cantilevering the adjustable hanging aerial terminal 1000 is that an individual can gain access to the terminal from a variety of positions. For example, as shown in FIG. 12, the aerial terminal may be swiveled approximately 180 degrees (180°) to an open line position to allow an individual to remove a front cover (shown as reference numeral 1002 in FIG. 11) and gain access to the internal terminal components. This is especially beneficial when the individual is positioned at an alternate location from the front cover 1002 (e.g., when the individual is initially positioned facing a back section 1006 of the closed terminal) and provides greater access and work space for the individual. Any routing wire, routing cable, and/or drop wire would likely enter and exit the adjustable hanging aerial terminal 1000 at a location near the pivotal connection 1075 so as to control the amount of slack to allow the adjustable hanging aerial terminal 1000 to swivel, pivot, and/or otherwise travel about the pivotal connection 1075 without damaging the routing wire, routing cable, and/or drop wire. Alternate locations on the adjustable hanging aerial terminal 1000 could also be used for entry and exit of the routing wire, routing cable, and/or drop wire so long as there is enough slack to accommodate the path of travel.

Figure 14:
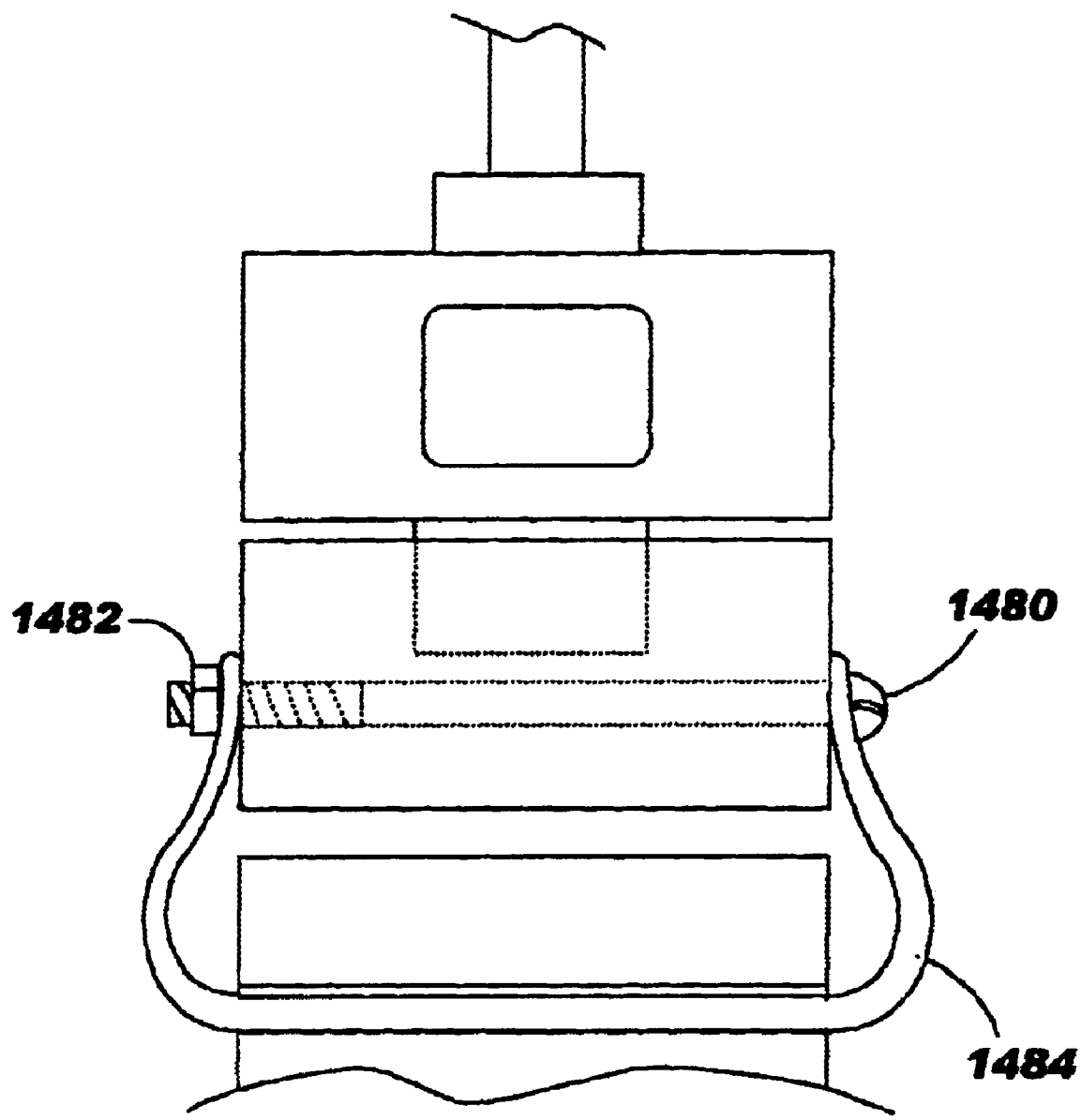

FIGS. 13A and 13B illustrate alternate fastening means according to a further embodiment of this invention. The fastening means is made up of a lower arm 1370 having an engagement groove 1372 similar to the complimentary engagement groove 1072; however, the lower arm includes an aperture through which a housing tie 1380 is passed and fastened through another aperture of a housing bracket 1305 attached to a housing section 1304. The housing tie 1380 may take on a variety of shapes, designs, and materials so long as it is able to fasten and support the weight of the adjustable hanging aerial terminal 1300. For example, FIG. 14 illustrates a bolt 1480 and nut 1482 assembly that passes through the aperture of lower arm 1370 and secures a tie 1484 or other similar device through the aperture of housing bracket 1305.

Figure 15:
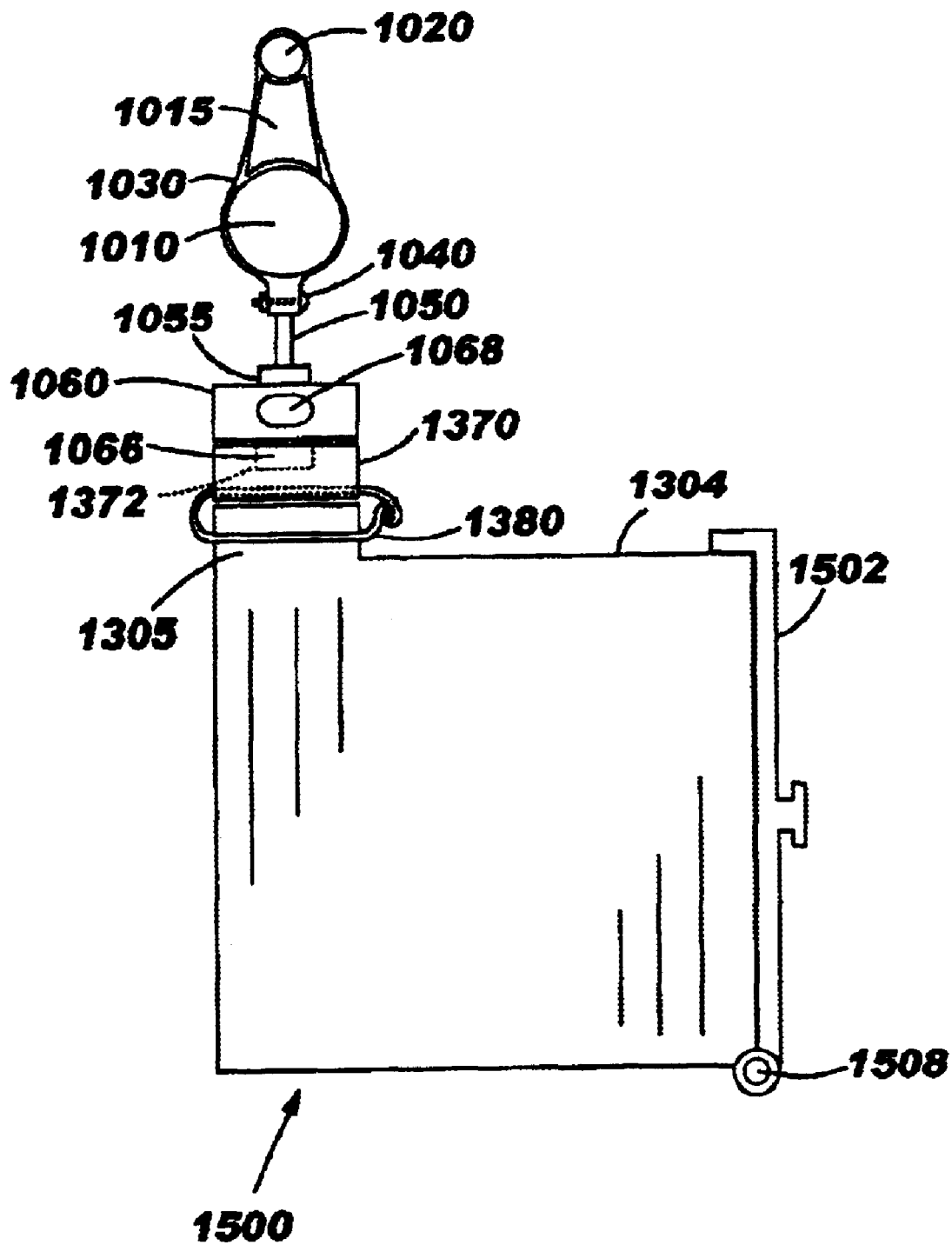
Figure 16:
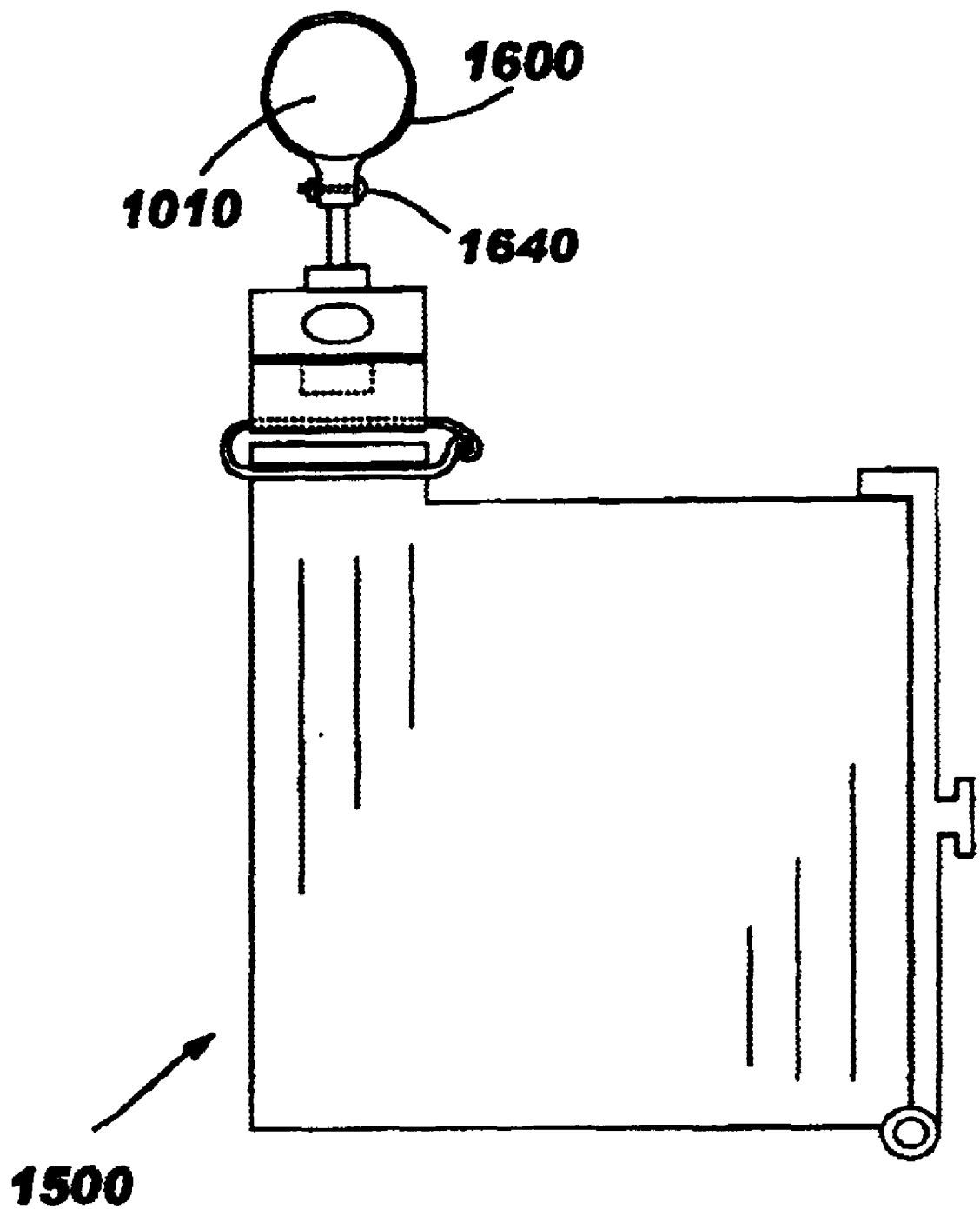
Figure 17:
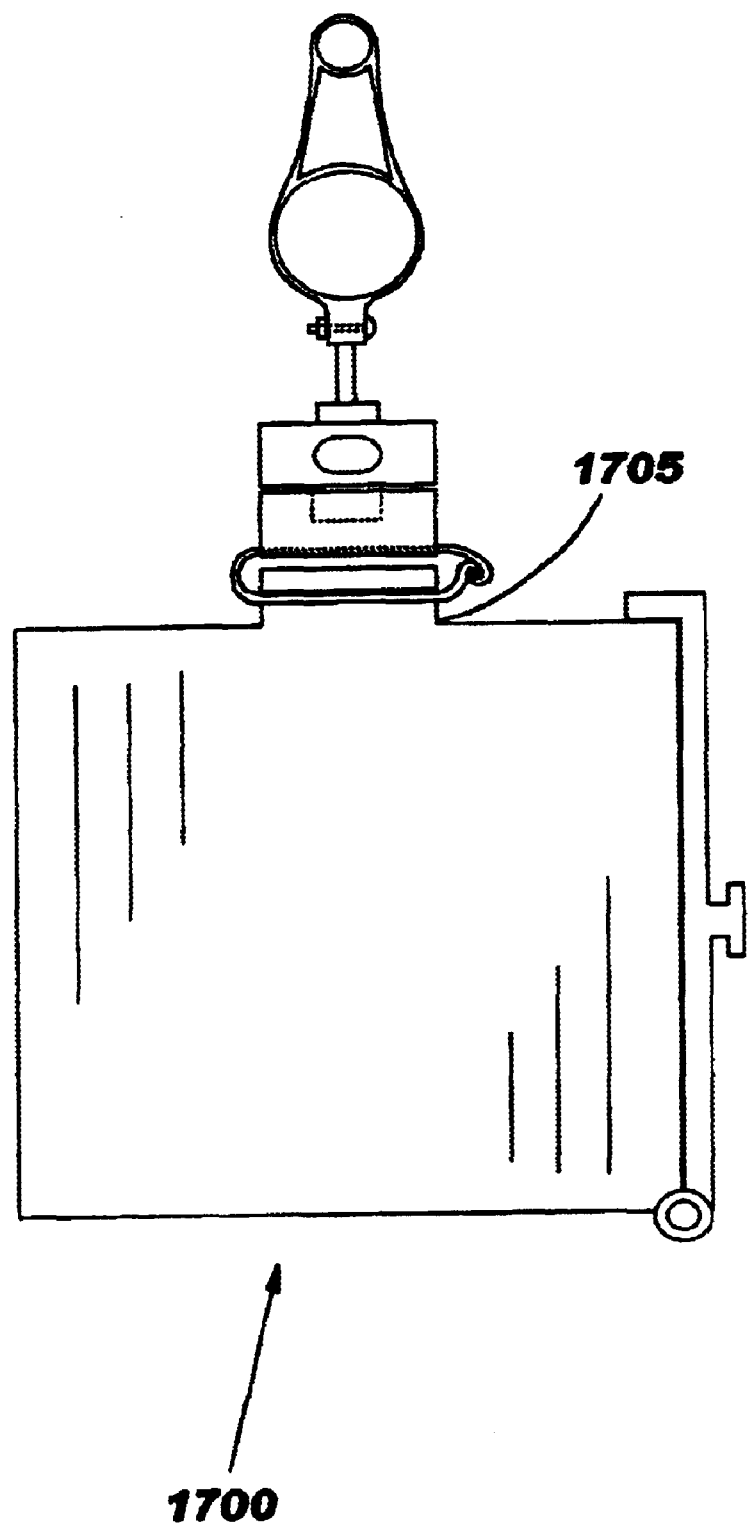

FIGS. 13A, 15, 16, and 17 further illustrate a variety of embodiments for an adjustable hanging aerial terminal having means to move in a cantilever fashion. FIG. 13A illustrates the adjustable hanging aerial terminal 1300 that is similar to the aerial cable terminal disclosed in U.S. Pat. No. 4,414,426. The adjustable hanging aerial terminal 1300 includes a similar detachable cover 1302 that is prevented from falling away, when removed, by a chain 1308. This invention provides greater work space for the individual to work when positioned at an alternate location from the cover 1302 because the individual does not have to work around the hanging cover 1302 when removed. FIG. 15 depicts an adjustable hanging aerial terminal 1500 having a cover 1502 secured to the housing section 1304 with a hinged portion 1508 so that an environmental-proof container (e.g., waterproof, rodent-proof, etc.) for telecommunications terminals is formed. While the hinged portion 1508 is shown connecting the cover 1502 to a side wall of the housing section 1304, the hinged portion 1508 may be located at alternative locations so long as access is provided to the internal components of the adjustable hanging aerial terminal 1500. Further, FIG. 16 shows the adjustable hanging aerial terminal 1500 with mounting means that includes a support member 1600 and bolt and nut assembly 1640 that only engage the routing cable 1010. Still further, FIG. 17 illustrates that a housing bracket 1705 could be centrally positioned on a housing section rather than to a side of a housing section as illustrated in FIG. 16.

In another embodiment, this invention includes a kit-of-parts capable of being assembled with conventional hanging aerial terminals such that the resulting apparatus provides an adjustable hanging aerial terminal as described in the above embodiments. Still further, this invention provides for methods of adjusting hanging aerial terminals. According to an embodiment, the method includes mounting a base member (e.g., the housing bracket) to an aerial terminal and mounting a hanging aerial terminal suspension system (e.g., the support member, support brackets, mounting components, and the adjustable joint) to a support wire, a routing cable or wire, or combinations thereof such that the resulting adjustable hanging aerial terminal can be positioned about the joint. According to another embodiment, the method includes fastening an aerial terminal to a lower arm of a hanging aerial terminal suspension system so that the aerial terminal can be positioned in a cantilever fashion in relation to an upper arm of the hanging aerial terminal suspension system and also includes mounting the upper arm to a support wire, routing wire, a routing cable and combinations thereof.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An aerial terminal, comprising:
    a housing section having a plurality of walls, the housing section for containing at least one of a routing wire, a routing cable, and a drop wire; and
    means for fastening the housing section to at least one adjustable joint, whereby the aerial terminal is movable about the at least one adjustable joint.

2. The aerial terminal of claim 1, further comprising:
    an aerial terminal suspension system including means for mounting the aerial terminal suspension system to at least one of the routing wire, the routing cable, and the drop wire, the at least one adjustable joint for rotatably attaching the aerial terminal to the aerial terminal suspension system.

3. The aerial terminal of claim 2, wherein the at least one adjustable joint allows the aerial terminal to rotate about a longitudinal axis of the housing section or a line parallel thereto when an external force is applied.

4. The aerial terminal of claim 2, the means for mounting the aerial terminal suspension system including at least one support bracket, the at least one support bracket allowing a support member to extend over at least one of the routing wire, the routing cable, and the drop wire.

5. The aerial terminal of claim 2, the means for mounting the aerial terminal suspension system including a longitudinally extending support bracket that includes a longitudinally extending support member, the longitudinally extending support member securable about at least one of the routing wire, the routing cable, and the drop wire.

6. The aerial terminal of claim 2, further comprising:
a locking mechanism, the locking mechanism capable of securing the aerial terminal in a desired position about the at least one adjustable joint.

7. The aerial terminal of claim 1, the means for fastening including at least one housing bracket on an outer portion of one of the plurality of walls of the housing section, the housing bracket including an aperture, whereby, an engagement means attaches the housing section to the at least one adjustable joint.

8. The aerial terminal of claim 1, further comprising:
a hook portion, the hook portion affixed to an outer portion of one of the plurality of walls of the housing section, the hook portion capable of allowing a force to be applied to move the aerial terminal about the adjustable joint.

9. An aerial terminal, comprising:
a housing section having a plurality of walls, the housing section for containing at least one of a routing wire, a routing cable, and a drop wire; and
means for fastening the housing section to a lower arm of a hanging aerial terminal suspension system, whereby the lower arm is movable in a cantilever fashion in relation to an upper arm of the hanging aerial terminal suspension system.

10. The aerial terminal of claim 9, wherein the hanging aerial terminal suspension system includes the lower arm, the upper arm, and means for mounting the aerial terminal suspension system to at least one of the routing wire, the routing cable, and the drop wire.

11. The aerial terminal of claim 10, the means for mounting the aerial terminal suspension system including at least one support bracket, each support bracket attached to the upper arm and each support bracket allowing a support member to extend over at least one of the routing wire, the routing cable, and the drop wire.

12. The aerial terminal of claim 10, wherein the lower arm is pivotally connected to the upper arm.

13. The aerial terminal of claim 9, the means for fastening including at least one housing bracket on an outer portion of one of the plurality of walls of the housing section, the housing bracket including an aperture, whereby, an engagement means attaches the housing section to the lower arm.

14. The aerial terminal of claim 9, further comprising:
a locking mechanism, the locking mechanism capable of securing the lower arm in a desired position relative to the upper arm.

15. A kit-of-parts for a hanging aerial terminal suspension system, comprising:
a base member attachable to an aerial terminal, the base member having fastening means to at least one adjustable joint, the at least one adjustable joint for rotatably attaching the aerial terminal to the aerial terminal suspension system, whereby the aerial terminal is movable about the at least one adjustable joint; and
means for mounting the hanging aerial terminal suspension system to at least one of a routing wire, a routing cable, and a drop wire.

16. A kit-of-parts for a hanging aerial terminal suspension system, comprising:
means for fastening an aerial terminal to a lower arm of a hanging aerial terminal suspension system, the lower arm movable in a cantilever fashion in relation to an upper arm of the hanging aerial terminal suspension system,
wherein the upper arm includes means for mounting the aerial terminal suspension system to at least one of a routing wire, a routing cable, and a drop wire.

17. A method of adjusting a hanging aerial terminal, comprising:
mounting a base member to an aerial terminal, the base member having fastening means attaching the base member to at least one adjustable joint; and
mounting a hanging aerial terminal suspension system to at least one of a routing wire, a routing cable, and a drop wire, the hanging aerial terminal suspension system including the at least one adjustable joint, the at least one adjustable joint rotatably attaching the aerial terminal to the aerial terminal suspension system.

18. The method of claim 17, further comprising:
moving the aerial terminal about the at least one adjustable joint.

19. A method of adjusting a hanging aerial terminal, comprising:
fastening an aerial terminal to a lower arm of a hanging aerial terminal suspension system, the lower arm movable in a cantilever fashion in relation to an upper arm of the hanging aerial terminal suspension system; and
mounting the upper arm to at least one of a routing wire, a routing cable, and a drop wire.

20. The method of claim 19, further comprising:
positioning the lower arm with the fastened aerial terminal in a cantilever fashion in relation to the upper arm.

* * * * *